United States Patent [19]

Blount

[11] 4,346,191

[45] Aug. 24, 1982

[54] PROCESS FOR THE PRODUCTION OF AMINE POLYSULFIDE SILICATE REACTION PRODUCTS AND THEIR REACTION PRODUCTS

[76] Inventor: David H. Blount, 5450 Lea St., San Diego, Calif. 92105

[21] Appl. No.: 240,001

[22] Filed: Mar. 3, 1981

Related U.S. Application Data

[63] Continuation-in-part of Ser. No. 104,577, Dec. 17, 1979, abandoned, which is a continuation-in-part of Ser. No. 19,178, Mar. 9, 1979, Pat. No. 4,197,229, which is a continuation-in-part of Ser. No. 921,728, Jul. 3, 1978, abandoned, which is a continuation-in-part of Ser. No. 881,247, Feb. 27, 1978, abandoned.

[51] Int. Cl.$^3$ ................................................ C08K 5/49
[52] U.S. Cl. .................................... 524/710; 525/523; 525/535; 524/745; 524/773; 524/800; 524/837; 528/381; 528/388; 528/389

[58] Field of Search ....................... 528/389, 381, 388; 525/523, 535; 260/29.2 B, 29.2 M, 29.2 TN, 29.2 EP, 29.2 N, 29.2 E; 524/710, 745, 773, 800, 837

[56] References Cited

U.S. PATENT DOCUMENTS 4,197,229  4/1980  Blount ................................. 528/389
4,282,129  8/1981  Blount ............................ 260/29.2 R Primary Examiner—Melvyn I. Marquis

[57] ABSTRACT

An alkali metal hydroxide, sulfur, a polyfunctional amine and an oxidated silicon compound are mixed, then heated to just above the melting temperature of sulfur while agitating for 10 to 30 minutes, thereby producing an alkali metal amine polysulfide silicate reaction product; then it is added to an aqueous solution containing an emulsifying or dispersing agent and is reacted with a polysubstituted organic compound, thereby producing a poly(amine polysulfide silicate) resinous product which may be used to cure epoxy resins.

27 Claims, No Drawings

PROCESS FOR THE PRODUCTION OF AMINE POLYSULFIDE SILICATE REACTION PRODUCTS AND THEIR REACTION PRODUCTS

CROSS-REFERENCE TO RELATED APPLICATION

This application is a continuation-in-part of my copending U.S. patent application, Ser. No. 104,577, filed on Dec. 17, 1979, now abandoned which is a continuation-in-part of my copending U.S. patent application, Ser. No. 19,178, filed on Mar. 9, 1979, now U.S. Pat. No. 4,197,229, which is a continuation-in-part of my U.S. patent application, Ser. No. 921,728, filed July 3, 1978, now abandoned, which is a continuation-in-part of my U.S. patent application, Ser. No. 881,247, filed Feb. 27, 1978, now abandoned.

BACKGROUND OF THE INVENTION

This invention relates to a process for the production of amine polysulfide silicate reaction product by reacting an alkali metal compound, sulfur, polyfunctional amine and an oxidated silicon compound to produce an alkali metal amine polysulfide silicate reaction product which may be further reacted with a polysubstituted organic compound, polyfunctional epoxide compound or mixture thereof to produce novel useful resinous products.

The novel alkali metal amine polysulfide silicate reaction product is very useful as an intermediary in the production of compounds and resinous products. The alkali metal amine polysulfide silicate reaction product may be reacted with an acid compound or salt-forming compound to produce an amine polysulfide silicate reaction product which may be further reacted with aldehydes, organic dicarboxylic acids, organic dicarboxylic acid anhydrides, epihalohydrins, polyepoxide compounds and resins, isocyanate compounds, polyisocyanate compounds, polyurethane prepolymers, polyisocyanate silicate prepolymers, ketones, polyhalogenated organic compounds and mixtures thereof, to produce resinous products. These resinous products may be used as molding compounds, as adhesives, as coating agents, as foams for insulation, etc.

The novel alkali metal amine polysulfide silicate reaction products are useful as an intermediary in the production of useful compounds and resinous products and may be reacted with polysubstituted organic compounds, epihalohydrin, polyepoxide compounds, isocyanate compounds, polyisocyanate compounds, polyurethane prepolymers, polyisocyanate silicate prepolymers, and mixtures thereof, in order to produce resinous products which may be used as molding material, as adhesives, as coating agents, as foams for insulation, as putties, as caulking agents, as elastomers, etc. The resinous product produced by the reaction of the alkali metal amine polysulfide silicate reaction product with polysubstituted organic compounds such as ethylene dichloride may be used to cure polyepoxy resins and polyurethane prepolymers.

Alkali metal amine polysilfide silicate reaction products are produced by reacting the following components:
A: sulfur;
B: an alkali metal hydroxide;
C: an oxidized silicon compound;
D: an organic polyfunctional amine.

Alkali metal amine polysulfide silicate reaction products are reacted with the following components to produce resinous products:
E: an organic compound having at least two carbon atoms, each of which is attached to a substituent which will split off during the reaction;
F: polyfunctional epoxide compounds and resins.

Components A

Sulfur in any of its commonly known forms may be used in this invention. The sulfur may also be reacted with an alkali metal compound to produce alkali metal sulfides and alkali metal polysulfide, or sulfur may be reacted with alkaline earth metal compounds to produce alkaline earth metal sulfides and alkaline earth metal polysulfides, and mixtures thereof may be used in this process. It is preferred to use sulfur. The alkali metal sulfides and alkaline earth metal sulfides may be used with sulfur, ammonium polysulfides and polysulfides of ethanolamines may also be used.

Component B

Any suitable alkali metal hydroxide may be used in this invention. Alkali metal oxides may also be used in this invention. Suitable alkali metal hydroxides include sodium hydroxide, potassium hydroxide, lithium hydroxide, and mixtures thereof. Sodium hydroxide is the preferred alkali metal hydroxide.

Component C

Any suitable oxidated silicon compound may be used in this invention such as silica, e.g., hydrated silica, silicoformic acid, polysilicoformic acid, silicic acid gel and silica sol, alkali metal silicates; alkaline earth metal silicates and natural silicates with free silicic acid radicals and mixtures thereof. Hydrated silica is the preferred oxidated silicon compound.

Component D

The polyamines to be used in this invention include those organic materials possessing a plurality of amino hydrogen, i.e., a plurality of

groups wherein N is an amino nitrogen. These include the aliphatic, cycloaliphatic, aromatic or heterocyclic polyamines as well as derivatives thereof as long as the derivatives still contain the necessary amino hydrogen.

Suitable examples of these materials include, among others, the aliphatic polyamines such as, for example, ethylenediamine, diethylenetriamine, triethylenetetramine, tetraethylenepentamine, 1,4-diaminobutane, 1,3-diaminobutane, hexamethylenediamine, 3-(N-isopropylamine) propylamine, N,N'-diethyl-1,3-propanediamine, hexapropyleneheptamine, penta(1-methyl-propylene) hexamine, tri(1,2,2-trimethylethylene) tetramine, tetra(1,3-dimethylpropylene) pentamine, penta-(1,5-dimethylamylene) hexamine, penta-(1,2-dimethyl-1-isopropylethylene) hexamine and N,N'-dibutyl-1,6-hexanediamine.

Suitable aliphatic polyamines are the alkylene polyamines of the formula

wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula

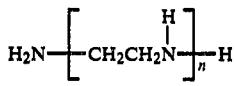

wherein n is an integer varying from about 2 to 8. A mixture of high molecular weight polyethylene polyamines and diethylenetriamine is especially preferred.

Another group of suitable materials is obtained by reacting the above-described polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like. This reaction between polyamines and monoepoxide is effected merely by bringing the components together in proper proportion. The adducts are obtained when a mol of the polyamine is reacted with not more than one mol of monoepoxide. The excess amine can be retained or can be removed by distillation. Examples of the monoepoxidepolyamine reaction products include, among others, N(hydroxypropyl) diethylenetriamine (reaction product of propylene oxide and diethylenetriamine) and N(2-hydroxy-3-phenoxypropyl) diethylenetriamine (reaction product of phenyl glycidyl ether and diethylenetriamine).

Suitable polyamines include the polyamines of the formula

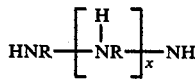

wherein x is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acid containing up to 20 carbon atoms.

Salts of polyamines and fatty acid (e.g., stearic, linoleic acid, dicanoic acid, lauric acid, oleic acids and the like) may be used in this invention.

Component E

Any suitable organic compound that will react with the alkali metal amine polysulfide silicate may be used. An organic compound is preferable, having at least two carbon atoms, of which one is attached to a substituent, which are split off during the reaction. These organic compounds which are the reactants used in the preparation of poly(organic polysulfide silicate) copolymers have the graphical skeleton carton structure of

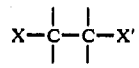

where

represents two adjacent carbon atoms, or

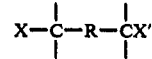

where X and X' represent the substituents which split off during the reaction. The R between the pair of reactive carbon atoms is selected from the following groups: saturated straight chain carbon atoms, unsaturated carbon atoms, ether linkages, aromatic structures, and others, for it is to be understood that other intervening structures may be employed. The X and X' substituents are halogens such as ethylene dichloride, ethylene dibromide, propylene dichloride or dibromide, halohydrins, dihalides of unsaturated hydrocarbon gases derived from pressure-cracking processes and natural gas-cracking processes. Other compounds such as those having more than two substituents such as 1,1,2-trichloroethane; 1,2,4-trichlorobutane; 1,2,3,4-tetrachlorobutane; trichloromesitylene and the like may be used. Others such as methylene chloride or bromide may also be used. Mixtures of these compounds may be used in this process.

Emulsifying or dispersing agents may be used in this invention to produce aqueous emulsions of the poly(organic amine polysulfide silicate) polymer. Any salt-stable compound which is highly hydrophobous in nature and has a hydrophobic group as one component and a hydrophilic group as the other may be used. The emulsifying or dispersing agent which may be used for the formation of lattices of small-particle size are those compounds having such groups as $SO_3$, $SO_4$, $NH_2$, etc., as the hydrophilic components and a higher-molecular-weight alkyl, aralkyl, aryl or alkyl group as the hydrophobic component. The more hydrophobic the entire compound becomes, the smaller the particle size becomes in the latex.

Compounds which are most suitable as emulsifying or dispersing agents for latex formation are the lignin sulfonates such as calcium and sodium lignin sulfonates, alkyl benzene sulfonates having more than 10 carbon atoms in the alkyl group, aryl alkyl sulfonates, sorbitan monolaurates, especially those which are oil soluble and slightly water soluble, and others. The dominance of the hydrophobic group over the hydrophilic groups is one of the important factors in producing a latex of small-particle size. The molecular weight of the hydrophobic group alone is not the deciding factor, for aryl groups, for example, may be more hydrophobic than an alkyl group of like molecular weight. Aryl alkyl groups are more hydrophobic than alkyl aryl groups of the same molecular weight. Thus, by selection of emulsifying or dispersing agents, the particle size of the latex can be varied to suit any particular needs. Emulsifiers which can be used are sorbitan monolaurates, alkyl aryl sulfonates, alkyl aryl sulfates, aryl alkyl sulfonates, aryl alkyl sulfates, lignin sulfonates, methyl cellulose, sulfonated petroleum fractions, polymerized alkyl aryl sulfonates, polymerized aryl alkyl sulfonates, soybean lecithin, and the like. The particle size can be controlled by selecting emulsifying or dispersing agents having different molecular-weight hydrophobic groups as well as different hydrophobic groups. The particle size will also vary with the concentration of the emulsifying or dispersing agents.

In certain cases, other dispersing agents such as magnesium hydroxide or aqueous dispersions of peptized starch, gelatin, glue, blood-albumen, egg albumen, or the like, may be used.

Component F

Any suitable polyfunctional epoxide compound may be used in this invention. Suitable polyfunctional epoxide compounds include epihalohydrins such as epichlorohydrin, epibromohydrin, methyl epichlorohydrin and di-epi-iodohydrin and polyepoxides. The polyepoxides to be used by the new process of the invention comprise those materials possessing more than one, and preferably at least two, vicinal epoxy groups, i.e.,

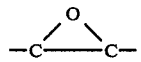

groups. These compounds may be saturated or unsaturated, aliphatic, cycloaliphatic, aromatic or heterocyclic, and may be substituted, such as chlorine, hydroxyl groups, ether radicals and the like. They may be monomeric or polymeric. The most common or conventional epoxy resins are obtained by reacting epichlorohydrin with a polyhydroxyl compound, such as Bisphenol A, in the presence of a catalyst.

For clarity, many of the polyepoxides and particularly those of the polymeric type are described in terms of epoxy equivalent values. The meaning of this expression is described in U.S. Pat. No. 2,633,458. The polyepoxides used in the present process are those having an epoxy equivalency greater than 1.0. Various examples of polyepoxides that may be used in the process of this invention are given in U.S. Pat. No. 2,633,458 and it is to be understood that so much of the disclosure of that patent relative to examples of polyepoxides is incorporated by reference into this specification.

The polyepoxides that are particularly preferred for use in the composition of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A Polyether B described in the above-noted U.S. Pat. No. 2,633,458 are good examples of polyepoxides of this type.

Other mono-epoxides which contain an active halogen compound such as trichlorobutylene oxide may be used as the polyfunctional epoxide.

SUMMARY OF THE INVENTION

I have discovered that an alkali metal amine polysulfide silicate reaction product may be produced by mixing and heating sulfur, an alkali metal hydroxide, polyfunctional amine, and an oxidated silicon compound.

The chemical reactions of this invention may take place under any suitable physical conditions. Many of the reactions will take place acceptably at a temperature just above the melting temperature of sulfur and at ambient pressure. The reaction is exothermic and may require cooling of the reactant vessel in order to keep the temperature below the boiling temperature of the components.

The components may be mixed in any satisfactory manner, or various components may be reacted first, then be reacted with the rest of the components. The preferred method of producing the alkali metal amine polysulfide silicate is to mix the Components A, B, C and D, then to heat the mixture to the melting temperature of sulfur while agitating until the reaction is substantially complete (10 to 30 minutes), thereby producing an alkali metal amine polysulfide silicate reaction product. Components A and B may be pre-reacted to produce alkali metal polysulfide, then be reacted with Components C and D to produce the alkali metal amine polysulfide silicate reaction product. Components B and C may be prereacted to produce an alkali metal silicate, then be reacted with Components A and D to produce the alkali metal amine polysulfide silicate reaction product.

Various water-soluble sulfides and polysulfides may be added with the components, such as alkali metal sulfides, alkaline earth metal sulfides, ammonium sulfides, alkali metal polysulfides, alkaline earth metal polysulfides, polysulfides of ethanolamines and mixtures thereof in the amount of up to 2 parts by weight of the Components A, B, C and D.

Alkali metal silicate produced by any of the methods known in the arts may be used in place of the alkali metal hydroxide and oxidated silicon compound. It is used in the amount of 1 to 2 parts by weight with 1 to 4 parts by weight of sulfur. The alkali metal silicate may also be used as the oxidated silicon compound and be reacted with the sulfur, alkali metal hydroxide and amine compound to produce alkali metal amine polysulfide silicate reaction product. About 1 to 2 parts by weight of granular alkali metal silicate are mixed with 1 to 4 parts by weight of sulfur, then heated to above the melting point of the sulfur while agitating at ambient pressure for 10 to 30 minutes, thereby producing a yellow, granular alkali metal silicate-sulfur condensation product which is then reacted with the amine compound.

The fine granular oxidated silicon compound may be first reacted with sulfur by mixing 1 to 4 parts by weight of the sulfur with 1 to 2 parts by weight of the oxidated silicon compound; then the mixture is heated to just above the melting temperature of sulfur while agitating for 10 to 30 minutes, thereby producing a sulfur-silicate condensation product. The sulfur-silicate condensation product is then mixed with about 2 parts by weight of an alkali metal hydroxide, preferably sodium hydroxide, and 0.5 to 4 parts by weight of a polyfunctional amine and the mixture is then heated to just above the melting temperature of sulfur while agitating for 10 to 30 minutes, thereby producing an alkali metal amine polysulfide silicate reaction product.

The components may be mixed in any suitable proportions. Suitable proportions of the components vary within the range of:

A: sulfur—1 to 4 parts by weight;

B: alkali metal hydroxide—2 parts by weight;
C: oxidated silicon compound—1 to 2 parts by weight;
D: polyfunctional amine—0.5 to 4 parts by weight.

The alkali metal amine polysulfide silicate reaction product may be reacted with an acid compound such as organic acids, inorganic acids, hydrogen-containing acid salts, and mixtures thereof, in the amount wherein the mols of acid radicals are about equal to the mols of alkali metal radicals, thereby producing an amine polysulfide silicate reaction product. 2 parts by weight of this reaction product may be mixed with 1 to 3 parts by weight of an epoxy resin which hardens to a tough epoxy polysulfide resinous product which may be used as an adhesive, as a coating agent and as a filler or may be applied to fiberglass in order to make rigid panels.

The alkali metal amine polysulfide silicate reaction product may be reacted with a substituted organic compound having at least 2 carbon atoms, each of which is attached to a substituent which will split off during the reaction to produce a poly(organic amine polysulfide silicate) resinous product. An aqueous dispersion of poly(organic amine polysulfide silicate) resinous product may be produced by adding the alkali metal amine polysulfide silicate reaction product to water containing 1% to 5% by weight of an emulsifying or dispersing agent to produce a 10% to 70%, by weight, aqueous solution; then a substituted organic compound is added to said aqueous solution in the amount wherein the mols of the substituted radicals are about equal to the mols of the alkali metal radicals in the mixture, agitating until the reaction is substantially complete (30 minutes to 8 hours), thereby producing an aqueous dispersion of poly(organic amine polysulfide silicate) resinous product.

The particles in the aqueous dispersion of poly(organic amine polysulfide silicate) resinous product may vary in size from about a micron in diameter to pellet size. The dispersions are heavy particles which settle. The particles may be washed with water to remove the salt and the unreacted components by filtering or by decantation. The aqueous dispersion may be coagulated on flocculation with aluminum sulfate, calcium nitrate, mineral acids, organic acids, inorganic hydrogen-containing salts and the like. The washed particles may be dried, then fused into sheets by raising the temperature to the softening temperature of the copolymer. This washed and dried copolymer may be cured with zinc oxide to produce an elastomer when heated to 70° C. to 90° C. To vulcanize the elastomer, the washed and dried copolymer (100 parts by weight), 30 to 40 parts by weight of carbon black, 0.5 parts by weight of stearic acid, 10 parts by weight of zinc oxide, 0.3 part by weight of benzothiozyl disulfide and diphenyl guanidine are thoroughly mixed, then heated in a mold until the mixture softens (70° C. to 90° C.); then pressure is applied to the elastomer until it cools. Various metallic oxides such as litharge, zinc oxide, magnesium oxides or other compounds of the class of sulphur carriers which are well known in the rubber industry may be incorporated in the copolymer to improve its characteristics.

Various inert materials such as those of the type used in compounding rubber, for example, fibers, wood flour, carbon black, glue, asbestos, and the like, may be compounded with the latex, either or without the sulphur carrier. These various materials may be incorporated in the coagulated latex also. About 1% to 10% by weight of the metallic oxide is used.

The aqueous dispersion of poly(organic amine polysulfide silicate) resinous product may be used to coat or impregnate absorbent materials such as fabrics, textiles, fibers, paper, leather and the like, as well as non-absorbent materials such as synthetic filaments and fibers, wood, metal, concrete, and others. This subsequently causes the coagulation in situ of the desired poly(organic amine polysulfide silicate) resinous product. The aqueous dispersion and coagulated resinous product may be used for caulking, putties, adhesives, binders, coating for wood and metal, for curing epoxy compounds and resins, as molding materials, for curing polyurethane prepolymers and for reacting with aldehydes and ketones to produce resinous products.

The alkali metal amine polysulfide silicate reaction product may be reacted with polyfunctional epoxide compounds such as epihalohydrins and polyepoxide compounds to produce an epoxy polysulfide silicate resinous product. It is preferred to use an epihalohydrin compound in the amount which contains about equal atoms of the halohydrin to the atoms of alkali metal present in the alkali metal amine polysulfide silicate reaction product. It is preferred that the polyepoxide compound or resin be added with the epihalohydrin in the amount of 1 to 3 parts by weight of the polyepoxide to 1 part by weight of the alkali metal amine polysulfide silicate reaction product.

The epoxy polysulfide silicate resinous product may be applied to wood or metal and may be used as an adhesive or coating agent. It may also be applied to fiberglass cloth in order to produce strong, rigid panels to be used in construction. It may be used to fill cavities, as a binder, etc.

Examples of useful products produced by the process of this instant invention are illustrated by examples as follows, but are not limited by these examples:

(a) About equal parts by weight of sodium propylene diamine polysulfide silicate reaction product and polyepoxide resin (glycidyl polyether of resorcinol) are thoroughly mixed, then applied to layers of fiberglass cloth to produce a ⅛"-thick panel. The panel cures in from 30 minutes to 24 hours to produce a strong panel which may be used in construction. The same method may be used to produce boats.

(b) The alkali metal polyamine polysulfide silicate is mixed with dilute hydrochloric acid until the pH is about 7 to 80 and the salt and water are drained off, thereby producing a soft, pliable product which may be used as caulking material around windows, doors, on boats, etc. The polyamine polysulfide silicate reaction product may be mixed with an equal volume of polyisocyanate (MDI), then used as a coating agent on wood. The mixture forms a hard, tough coating on the wood in from 2 to 12 hours.

(c) Sodium diethylenetriamine polysulfide silicate reaction product is mixed in an aqueous solution with ethylene chloride to produce an emulsion ethylene diethylenetriamine polysulfide silicate reaction product which is used to saturate a cloth canvas; then a dilute solution of sodium hydrogen sulfate is added until the reaction product coagulates, thereby producing a waterproof canvas. The salt is washed away with water. The waterproof canvas may be used for awnings, tents, coverings, etc. The coagulated reaction product may be molded into useful objects such as knobs, handles, toys, etc., by using heat and pressure.

(d) Potassium diethylenetriamine polysulfide silicate reaction product and epichlorohydrin, in an amount wherein the potassium and chloride atoms are about equal, are mixed, then poured into a mold of an art object. The mixture cures in from 30 minutes to 12 hours to produce a solid molded art object such as a doll, bird, statue, etc.

The primary object of the present invention is to produce alkali metal amine polysulfide silicate reaction products. Another object of the present invention is to present a novel process for the production of alkali metal amine polysulfide silicate reaction products and to react these products with substituted organic compound in order to produce poly(organic amine polysulfide silicate) resinous product. Still another object is to produce alkali metal amine polysulfide silicate reaction products which will react with polyfunctional epoxide compounds to produce epoxy polysulfide silicate resinous products which may be used as adhesives, as coating agents, as fillers, as binders, as caulking compound, as molding resins, etc. Another object is to produce amine polysulfide silicate reaction products which can be reacted with polyfunctional epoxide compounds to produce epoxy polysulfide silicate resinous products.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of poly(amine polysulfide silicate) reaction products. Parts and percentages are by weight unless otherwise indicated.

EXAMPLE 1

About 5 parts by weight of sulfur, 3 parts by weight of fine granular hydrated silica, 5 parts by weight of sodium hydroxide flakes and 3 parts by weight of diethylenetriamine are mixed, then heated to just above the melting temperature of sulfur while agitating for 10 to 30 minutes at ambient pressure, thereby producing a brown, solid alkali metal amine polysulfide silicate reaction product. This product is soluble in water and may be reacted chemically with epoxy resins to cure the epoxy resin into a solid product.

EXAMPLE 2

About 3 parts by weight of sulfur, 2 parts by weight of fine granular hydrated silica, 3 parts by weight of sodium hydroxide flakes and 2 parts by weight of propylenediamine are mixed, then heated to just above the melting temperature of the sulfur while agitating at ambient pressure for 10 to 30 minutes, thereby producing a brown, solid alkali metal amine polysulfide silicate reaction product which is soluble in water.

EXAMPLE 3

About 2 parts by weight of sulfur, 1 part by weight of fine granular hydrated silica, 2 parts by weight of potassium hydroxide pellets, and 2 parts by weight of 1,6-hexamethylenediamine are mixed, then heated to just above the melting point of sulfur while agitating for 10 to 30 minutes, thereby producing a brown, solid alkali metal amine polysulfide silicate reaction product.

EXAMPLE 4

About 2 parts by weight of sulfur, 1 part by weight of fine granular silicic acid, 2 parts by weight of sodium hydroxide flakes and 1 part by weight of triethylenetetramine are mixed, then heated to just above the melting temperature of sulfur while agitating for 10 to 30 minutes, thereby producing an alkali metal amine polysulfide silicate reaction product.

Any of the polyfunctional amines listed in Component D may be used in this Example in place of triethylenetetramine.

EXAMPLE 5

About 2 parts by weight of sulfur and 1 part by weight of fine granular hydrated silica are mixed, then heated to just above the melting temperature of sulfur while agitating for 10 to 30 minutes, thereby producing a sulfur-silicate condensation product; the product is then added to 10 parts by weight of water containing 2 parts by weight of sodium hydroxide, 0.5 part to 1 part by weight of sodium sulfide, and 1 part by weight of ethylenediamine. The mixture is heated to just below the boiling temperature of the mixture while agitating at ambient pressure for 1 to 4 hours, thereby producing an aqueous solution of alkali metal amine polysulfide silicate reaction product.

The aqueous alkali metal amine polysulfide silicate reaction product will react with about an equal volume of a polyisocyanate or isocyanate-terminated urethane prepolymer in order to produce polyurethane silicate resinous products or foams.

EXAMPLE 6

About 3 parts by weight of sulfur, 2 parts by weight of sodium silicate and 2 parts by weight of diethylenetriamine are mixed, then heated to just above the melting temperature of sulfur while agitating for 10 to 30 minutes, thereby producing an alkali metal amine polysulfide silicate reaction product.

This reaction product may be utilized to cure epoxy resins.

EXAMPLE 7

About 2 parts by weight of sulfur, 1 part by weight of fine granular hydrated silica and 2 parts by weight of sodium hydroxide flakes are mixed, then heated to just above the melting point of the sulfur while agitating for about 30 minutes, thereby producing a sodium-sulfur-silicate condensation product. About 2 parts by weight of meta-tolylene diamine are mixed with the sodium-sulfur-silicate condensation, then heated to the boiling temperature of the mixture while agitating for 10 to 30 minutes, thereby producing an alkali metal amine polysulfide silicate reaction product.

Other polyamines, polyamides with at least 2 free amine groups, polyamine-epoxy condensation products with at least 2 free amino groups and other polyfunctional amines listed in Component D, and mixtures thereof, may be used in place of metatolylene diamine.

EXAMPLE 8

About two parts by weight of sodium hydroxide flakes, 1 part by weight of fine granular hydrated silica and 3 parts by weight of sulfur are mixed, then heated to just above the melting temperature of sulfur while agitating for 10 to 30 minutes at ambient pressure, thereby producing an alkali metal polysulfide silicate condensation product. About 2 parts by weight of the sodium polysulfide silicate condensation product and 2 parts by weight of diethylenetriamine are mixed, then 3 parts by weight of epichlorohydrin are slowly added while keeping the temperature below the boiling temperature of epichlorohydrin and agitating, thereby producing a brown, solid epoxy polysulfide silicate resinous product. The resinous product may be washed with hot water to remove the salt and unreacted components. It softens at about 80° C. to 90° C. and melts at about 130° C. The resinous product may be heated to 90° C. to 120° C., then molded under pressure to produce toys, knobs, handles, art objects, etc.

EXAMPLE 9

About 3 parts by weight of the alkali metal amine polysulfide silicate reaction product, as produced in Example 1, and 2 parts by weight of epichlorohydrin are mixed by slowly adding the epihalohydrin to the alkali metal amine polysulfide silicate reaction product while agitating and keeping the temperature to below the boiling temperature of epichlorohydrin, thereby producing an epoxy polysulfide silicate resinous product.

Other epihalohydrin compounds may be used in place of epichlorohydrin, such as epibromohydrin, methyl epichlorohydrin, di-epi-iodohydrin and mixtures thereof.

EXAMPLE 10

About 3 parts by weight of an alkali metal amine polysulfide silicate reacton product, as produced in Example 2, are added to 10 parts by weight of water to produce an aqueous solution; then about 2 parts by weight of epichlorohydrin are slowly added while agitating and keeping the temperature below the boiling temperature of epichlorohydrin, thereby producing an aqueous suspension of epoxy polysulfide silicate resinous product which coagulates, thereby forming a yellow, soft, flexible solid epoxy polysulfide silicate resinous product. The water is filtered off to remove the salt and unreacted components. The resinous product may be used as a caulking compound and as a curing agent for epoxy resins and polyisocyanates.

EXAMPLE 11

About 1 part by weight of diethylenetriamine, 2 parts by weight of fine granular hydrated silica, 5 parts by weight of sulfur and 5 parts by weight of sodium hydroxide are mixed, then agitated at a temperature just above the melting temperature of sulfur and at ambient pressure for 10 to 30 minutes, thereby producing a brown, solid sodium diethylenetriamine polysulfide silicate reaction product; the reaction product is then added to about 25 parts by weight of water to produce an aqueous solution. To this aqueous solution, 0.2 part by weight of lignosulfonic acid sodium salts and 3 parts by weight of ethylene dichloride are added while agitating at a temperature just below the boiling temperature of ethylene dichloride for 30 minutes to 8 hours, thereby producing a yellow aqueous dispersion of poly(organic amine polysulfide silicate) resinous product. The resinous product gradually settles to the bottom and the water and salt may be decanted off. The resinous product is somewhat elastic and may be cured with zinc oxide, heat and pressure, and be molded into useful objects such as knobs, toys, handles, etc.

EXAMPLE 12

About 4 parts by weight of diethylenetriamine, 2 parts by weight of sodium hydroxide, 4 parts by weight of sulfur and 2 parts by weight of sodium silicate are mixed, then agitated at a temperature just above the melting temperature of sulfur for 10 to 30 minutes, thereby producing a thick, brown liquid of alkali metal amine polysulfide silicate reaction product; then 3 parts by weight of epichlorohydrin and 10 parts by weight of an epichlorohydrin-Bisphenol A epoxy resin are mixed with the alkali metal amine polysulfide silicate reaction product, thereby producing a tough, solid epoxy polysulfide silicate resinous product in 1 to 3 hours. The mixture may be applied to woven fiberglass or cloth while pliable, after which it cures to produce strong, rigid products such as panels, boats, containers, tubes, etc. The mixture may also be cured in molds to produce useful products, such as knobs, handles, art objects, molding etc.

EXAMPLE 13

About 3 parts by weight of ethylenediamine, 5 parts by weight of sulfur, 3 parts by weight of fine granular hydrated silica and 5 parts by weight of sodium hydroxide flakes are mixed. The reaction is exothermic and requires very little heat to keep the temperature above the melting temperature of sulfur. The mixture is agitated for 10 to 30 minutes, thereby producing an alkali metal amine polysulfide silicate reaction product.

The reaction product may be mixed with an epoxy resin in about equal proportions, then painted on wood and utilized as a protective coating.

EXAMPLE 14

About 5 parts by weight of the alkali metal amine polysulfide silicate reaction product, as produced in Example 13, is added to 10 parts by weight of water; then 3 parts by weight of epichlorohydrin are slowly added while agitating and keeping the temperature below the boiling point of epichlorohydrin for 10 to 30 minutes, thereby producing a soft, flexible, yellow epoxy polysulfide silicate resinous product which is removed from the water. The resinous product may be used as a caulking compound.

Any of the epihalohydrin compounds listed in Component F may be used in place of epichlorohydrin.

EXAMPLE 15

About 3 parts by weight of epichlorohydrin are slowly added to 5 parts by weight of the alkali metal amine polysulfide silicate reaction product as produced in Example 13, thereby producing a tough, brown, solid epoxy polysulfide silicate resinous product.

Any of the epihalohydrin compounds listed in Component F may be used in place of epichlorohydrin.

EXAMPLE 16

About 5 parts by weight of the alkali metal amine polysulfide silicate reaction product, as produced in Example 13, 3 parts by weight of epichlorohydrin and 3 parts by weight of epoxidized soybean oil are mixed, then painted on wood, the mixture becoming a tough, brown, solid epoxy polysulfide silicate resinous product within a few hours and acting as a protective coating.

Any of the polyepoxides listed in Component F may be used in place of the epoxidized soybean oil.

EXAMPLE 17

About 5 parts by weight of the alkali metal amine polysulfide silicate reaction product, as produced in Example 13, are added to 15 parts by weight of water, to form an aqueous solution; then 3 parts by weight of methylene chloride are added. The mixture is then agitated at a temperature just below the boiling point of methylene chloride for 30 minutes to 8 hours, thereby producing a yellow-colored, somewhat elastic solid poly(organic amine polysulfide silicate) resinous product which precipitates from the aqueous solution and is recovered by filtration.

Any of the other previously described disubstituted organic compounds may be used in place of the methylene chloride in this Example, such as ethylene dibromide, propylene dichloride or dibromide, dihalides of unsaturated hydrocarbon gases derived from pressure-cracking processes or natural gas-cracking processes, polyhalide alkanes such as 1,1,2-trichloroethane; 1,2,4-trichlorobutane; trichloromesitylene and mixtures thereof.

The poly(organic amine)polysulfide silicate may be precipitated on fabric to form a waterproof cloth to be used as tents, tarpaulins, etc.

EXAMPLE 18

About 5 parts by weight of the alkali metal amine polysulfide silicate reaction product, as produced in Example 1, are added to 15 parts by weight of water; then dilute hydrochloric acid is added until the pH is about 8 to 9, thereby producing an aqueous dispersion of an amine polysulfide silicate reaction product. To this aqueous dispersion, 3 parts by weight of epichlorohydrin are slowly added while agitating and keeping the temperature below the boiling temperature of the epichlorohydrin for 10 to 30 minutes, thereby producing an epoxy polysulfide silicate resinous product which coagulates and forms a tough, flexible solid.

EXAMPLE 19

About equal mols of hydrochloric acid and the alkali metal amine silicate resinous product, as produced in Example 2, are mixed, thereby producing amine polysulfide silicate reaction product and salt.

About equal parts by weight of an epichlorohydrin-Bisphenol A epoxy resin and the amine polysulfide silicate reaction product are mixed, thereby producing a hard, tough, solid epoxy polysulfide silicate resinous product. This mixture, while in a liquid state, may be applied to woven fiberglas or cloth and then cured to a solid product such as panels, tubes, boats, containers, etc.

Although specific conditions and ingredients have been described in conjunction with the above examples of preferred embodiments, these may be varied and other reagents and additives may be used, where suitable, as described above, with similar results.

Other modifications and applications of this invention will occur to those skilled in the arts, upon reading this disclosure. These are intended to be included within the scope of this invention as defined in the appended claims.

I claim:

1. The process for the production of alkali metal amine polysulfide silicate reaction product by mixing and heating the following components:

A. sulfur containing compound selected from the group consisting of sulfur, alkali metal sulfides, alkali metal polysulfides, alkaline earth metal polysulfides and mixtures thereof, in an amount of 1 to 4 parts by weight,
   B. alkali metal hydroxide in an amount of 2 parts by weight,
   C. organic polyamine, in the amount of 0.05 to 4 parts by weight,
   D. oxidated silicon compound, in the amount of 1 to 2 parts by weight, at a temperature just above the melting point of sulfur until the reaction is substantially complete.

2. The process of claim 1 wherein the alkali metal hydroxide is selected from the group consisting of sodium hydroxide, potassiumhydroxide and mixtures thereof.

3. The process of claim 1 wherein the polyamine is a polyalkylene polyamine.

4. The process of claim 1 wherein the polyamine is a polyalkylene polyamine.

5. The process of claim 1 wherein the polyamine is diethylenetriamine.

6. The process of claim 1 wherein the oxidated silicon compound is selected from the group consisting of hydrated silica, alkali metal silicates, natural oxidated silicon compounds containing free silicic acid, and mixtures thereof.

7. The product produced by the process of claim 1.

8. The process of claim 1 wherein additional steps are taken wherein the alkali metal amine polysulfide silicate reaction product is added to water containing 1% to 5% of an emulsifying or dispersing agent to produce an aqueous solution containing 10% to 70% by weight of the reaction product; then a substituted organic compound having at least two carbon atoms, each of which is attached to a substituent which will split off during the reaction, is added to said aqueous solution in the amount wherein the mols of the substituted radicals of the substituted organic compound in the mixture are about equal to the mols of the alkali metal radicals in the mixture, which is then agitated until the reaction is substantially complete, thereby producing an aqueous dispersion of poly(organic amine polysulfide silicate) resinous product.

9. The product produced by the process of claim 8.

10. The process of claim 8 wherein the emulsifying or dispersing agent is selected from the group consisting of lignin sulfonate, alkyl aryl sulfonates, aryl alkyl sulfonates, sorbitan monolaurates, alkyl aryl sulfates, aryl alkyl sulfates, methyl cellulose, sulfonated petroleum fractions, polymerized alkyl aryl sulfonates, polymerized aryl alkyl sulfonates, soybean lecithin and mixtures thereof.

11. The process of claim 8 wherein the substituted organic compound is selected from the group consisting of ethylene dichloride; ethylene dibromide; propylene dichloride; propylene dibromide; dihalides of unsaturated hydrocarbon gases derived from pressure-cracking processes and material gas-cracking processes; 1,1,2-trichloroethane; 1,2,4-trichlorobutane; trichloromesitylene; and mixtures thereof.

12. The process of claim 8 wherein the substituted organic compound contains at least two halogen substituents.

13. The process of claim 8 wherein the substituted organic compound is ethylene dichloride.

14. The process of claim 1 wherein additional steps are taken wherein an epihalohydrin compound is mixed with the alkali metal amine polysulfide silicate reaction product in the amount wherein the halogen atoms are about equal to the alkali metal atoms and allowed to react, thereby producing an epoxy polysulfide silicate resinous product.

15. The process of claim 14 wherein the epihalohydrin is epichlorohydrin.

16. The product produced by the process of claim 14.

17. The process of claim 1 wherein additional steps are taken wherein an epihalohydrin and a polyepoxide having more than one vic-epoxy group are mixed with the alkali metal amine polysulfide silicate reaction product and are allowed to react, thereby producing an epoxy polysulfide silicate resinous product.

18. The process of claim 17 wherein the epihalohydrin is epichlorohydrin and is added in the amount wherein the halogen atoms are about equal to the alkali metal atoms.

19. The process of claim 17 wherein the polyepoxide is selected from the group consisting of a glycidyl polyether of a polyhydric compound of the group consisting of polyhydric alcohols and polyhydric phenols, and is added in the amount of 1 to 3 parts by weight of the polyepoxide to 1 part by weight of the alkali metal amine polysulfide silicate reaction product.

20. The product produced by the process of claim 17.

21. The process of claim 1 wherein the alkali metal hydroxide, sulfur and oxidated silicon compound are first reacted by heating to produce an alkali metal polysulfide silicate reaction product, then heated with the polyfunctional amine to produce an alkali metal amine polysulfide silicate reaction product.

22. The process of claim 1 wherein additional steps are taken wherein an acid compound which is selected from the group consisting of mineral acids, organic acids, hydrogen-containing acid salts, and mixtures thereof, is added to the alkali metal amine polysulfide silicate reaction product in the amount wherein the mols of acid radicals are about equal to the mols of alkali metal radicals, the mixture being agitated, thereby producing an amine polysulfide silicate reaction product.

23. The product produced by the process of claim 17.

24. The process of claim 1 wherein additional steps are taken wherein a mineral acid is added to the alkali metal amine polysulfide silicate reaction product in the amount wherein the mols of mineral acid are about equal to the mols of alkali metal radicals, the mixture then being agitated, thereby producing an amine polysulfide silicate reaction product, after which 1 to 3 parts by weight of a polyfunctional epoxide compound are added to 2 parts by weight of the amine polysulfide silicate reaction product and thoroughly mixed, thereby producing an epoxy polysulfide silicate resinous product.

25. The product produced by the process of claim 24.

26. The process of claim 24 wherein the polyfunctional epoxide compound is epichlorohydrin.

27. The process of claim 24 wherein the polyfunctional epoxide compound is selected from the group consisting of a glycidyl polyether of a polyhydric compound of the group consisting of polyhydric alcohols and polyhydric phenols.

* * * * *